United States Patent
Besnard

[19]

[11] Patent Number: 6,059,439
[45] Date of Patent: May 9, 2000

[54] SYSTEM AND APPARATUS FOR THE PRE-AUTOMATION OF THE INSTALLATIONS OF A BUILDING

[75] Inventor: Philippe Besnard, Griselles, France

[73] Assignee: Robot Consult, Combs La Ville, France

[21] Appl. No.: 08/557,043

[22] PCT Filed: Apr. 6, 1995

[86] PCT No.: PCT/FR95/00442

§ 371 Date: May 1, 1996

§ 102(e) Date: May 1, 1996

[87] PCT Pub. No.: WO95/27929

PCT Pub. Date: Oct. 19, 1995

[30] Foreign Application Priority Data

Apr. 8, 1994 [FR] France .................................. 94/04157

[51] Int. Cl.[7] .................................................. G05B 15/02
[52] U.S. Cl. ..................... 364/138; 364/550; 340/825.06
[58] Field of Search ..................................... 364/138, 130, 364/550, 551.01; 340/286.01, 825.06

[56] References Cited

U.S. PATENT DOCUMENTS

| | | | |
|---|---|---|---|
| 4,567,557 | 1/1986 | Burns ...................................... | 364/145 |
| 5,086,385 | 2/1992 | Launey et al. .......................... | 364/188 |
| 5,128,855 | 7/1992 | Hilber et al. ............................ | 364/132 |
| 5,510,975 | 4/1996 | Ziegler, Jr. .............................. | 364/148 |
| 5,528,215 | 6/1996 | Siu et al. ............................ | 340/286.01 |
| 5,615,079 | 3/1997 | Eggert et al. ........................... | 361/637 |
| 5,621,662 | 4/1997 | Humphries et al. .................... | 364/550 |

OTHER PUBLICATIONS

Tsang et al., "Development of a Distributive Lighting Control System Using Local Operating Network", IEEE, May 24, 1994.

Honeywell, "New SDS Smart Distributed System from Honeywell Today's Distributed Machine Control System Lays the Foundation for Tomorrow", Jul. 24, 1994.

*Primary Examiner*—James P. Trammell
*Assistant Examiner*—Patrick Assouad
*Attorney, Agent, or Firm*—Pollock, Vande Sande & Amernick

[57] ABSTRACT

A system monitor sensors which control actuating elements in a building. The supervision unit essentially collects information from the sensors and controls the actuating elements. A precable system in the building connects the supervision unit to input/output connections of a plurality of interconnection devices. The plurality of interconnection devices each include a plurality of terminal boards connected to the sensors and actuating elements through a first set of cables. A microprocessor has a portion of the I/O connections connected to the terminal board through a second set of cables, transmitting signals between the actuating elements, sensors and the supervision unit.

5 Claims, 3 Drawing Sheets

SYSTEM AND APPARATUS FOR THE PRE-AUTOMATION OF THE INSTALLATIONS OF A BUILDING

In general, the invention concerns the automation of buildings and, more particularly, a system allowing the pre-automation of industrial, tertiary, or other buildings to make it possible subsequently to install various equipment and installations.

Conventional practice includes equipping industrial, tertiary, or other buildings with pre-cabling systems which make it possible to install at a later time computer of telephone equipment. These pre-cabling systems comprise passive elements such as cables, sockets, distributing frames, terminal boards, pre-cabling trusses, supports, etc.

More and more, industrial, tertiary, and other buildings comprise equipment and installations to ensure the technical and administrative management thereof in the fields of air-conditioning, security, access-control, and the management of scheduling and visitors. These facilities and installations include sensors which, in each of the areas mentioned, supply information to a dedicated automaton which elaborates signals controlling actuating elements belonging to the same field and located at different sites within the building. Furthermore, each piece of equipment or installation is provided with a supervision unit which centralizes the information and monitors it, this unit possibly being shared by installations.

Of course, each of the pieces of equipment and installations may be pre-cabled in a manner analogous to that of computer and telephone equipment, but each piece of equipment has a different pre-cabled network comprising only passive elements, such as cables and terminal boards.

SUMMARY OF THE INVENTION

One of the purposes of the invention under consideration is thus to produce a device for the pre-automation of an industrial, tertiary, or other building, which makes it possible to supervise all or a part of the sensors and actuating elements in at least one area of management located in a particular zone of the building.

Another purpose of the present invention lies in producing a system for pre-automation of an industrial, tertiary, or other building, comprising several pre-automation devices distributed in the building and which are connected to each other and to at least one supervision unit by a pre-cabling network.

The invention relates to a device for pre-automation for the installations of an industrial, tertiary, or other building to be connected to a specific number of sensors and actuating elements and characterized by the fact that it comprises at least one terminal board provided to be connected by cables to said different types of sensors and actuating elements, a microprocessor, and an inputs/outputs circuit, in order to connect the terminal board to the microprocessor.

The invention further concerns a system for pre-automation of the various installations in an industrial, tertiary, or other building, which comprises a unit for supervision of said installations, characterized by the fact that it comprises a plurality of pre-automation devices which are distributed in said building, and a pre-cabling network to connect said pre-automation apparatuses to said supervision unit.

Other purposes, characteristics, and advantages of the present invention emerge from a reading of the following description of one embodiment thereof, said description being provided in relation to the attached drawings.

DESCRIPTION OF THE PREFERRED EMBODIMENTS

Figure 1:
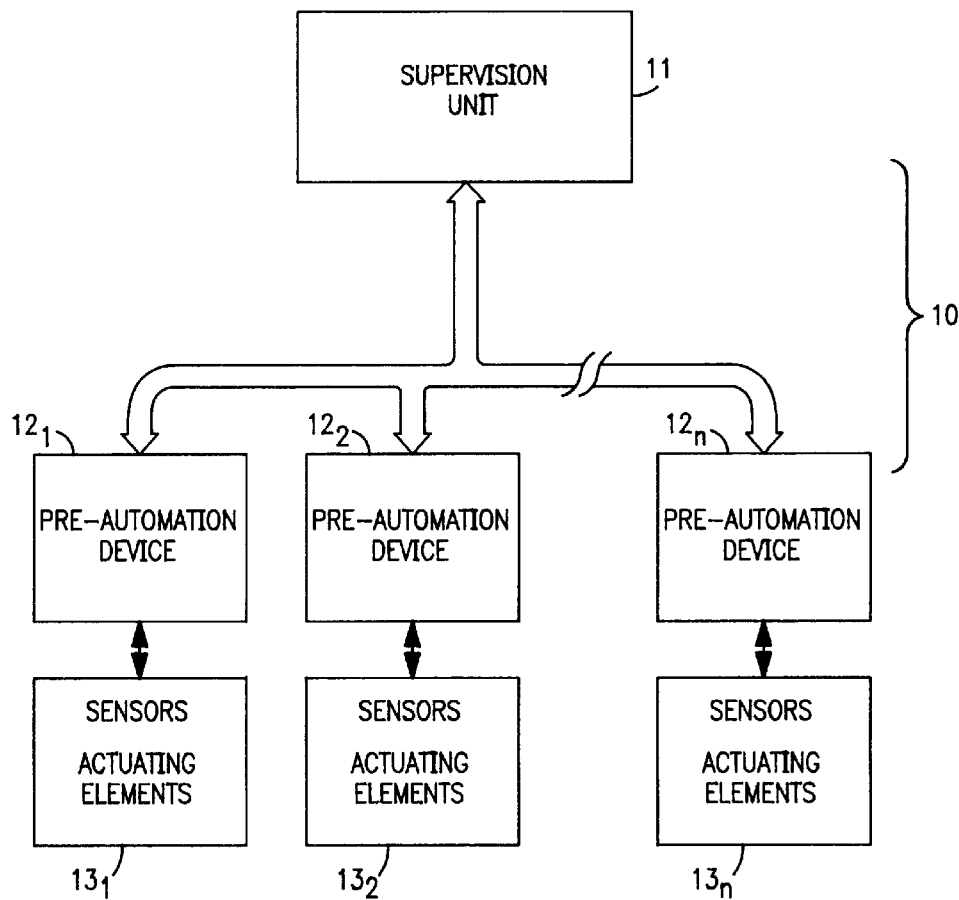
FIG. 1 is a functional diagram of a system for pre-automation of the installations of an industrial, tertiary, or other building according to the invention.

In FIG. 1, a pre-automation system according to the invention for the installations of an industrial, tertiary, or other building comprises a network of cables 10 which is designed to connect a supervision unit 11 to pre-automation devices $12_1$, $12_2$ ... $12_n$, numbering n which are produced in accordance with the invention. Each pre-automation device $12_1$, to $12_n$, is connected respectively to sensors and actuating elements referenced as $13_1$, to $13_n$.

Figure 2:
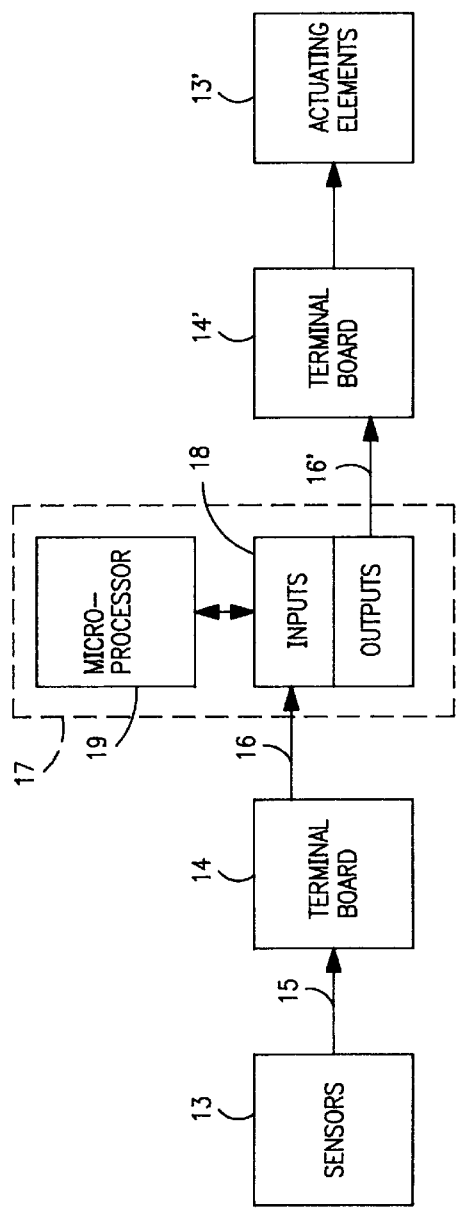
FIGS. 2 and 3 are functional diagrams of a pre-automation device according to the invention.
Figure 3:
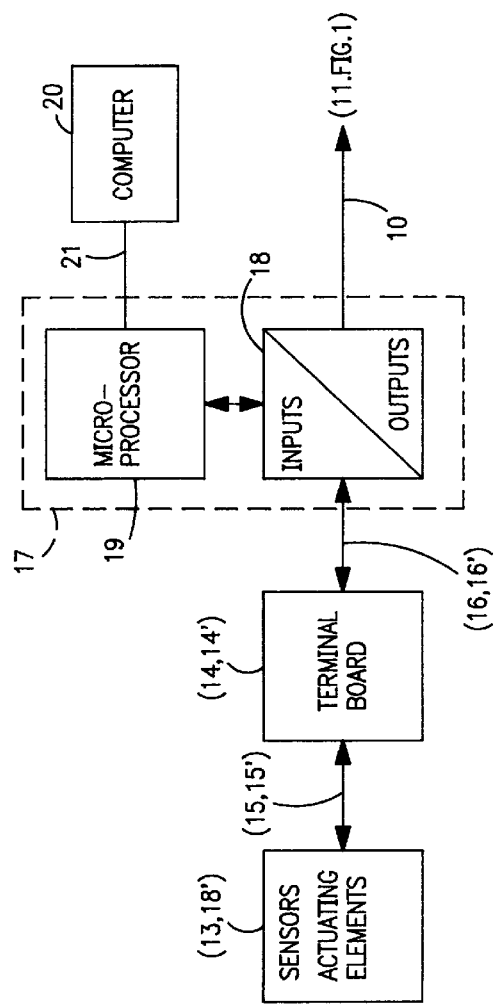

Each pre-automation device 12 comprises at least (FIGS. 2 and 3) one terminal board 14, 14', whose terminals are connected, on the one hand, as indicated by conductors 15, 15', to sensors 13 and to actuating elements 13', and, on the other hand, by conductors 16, 16', to an circuit 17. The circuit 17 comprises an inputs/outputs circuit 18, which is connected, on the one hand, to the terminals 14, 14' and, on the other, to a microprogrammed unit 19 such as a microprocessor.

The inputs-outputs circuit 18 is also connected to the supervision unit 11 (FIG. 1) by the cable network of cables 10. Furthermore, the microprocessor 19 may be connected to a portable computer 20 by a cable 21.

Figure 4:
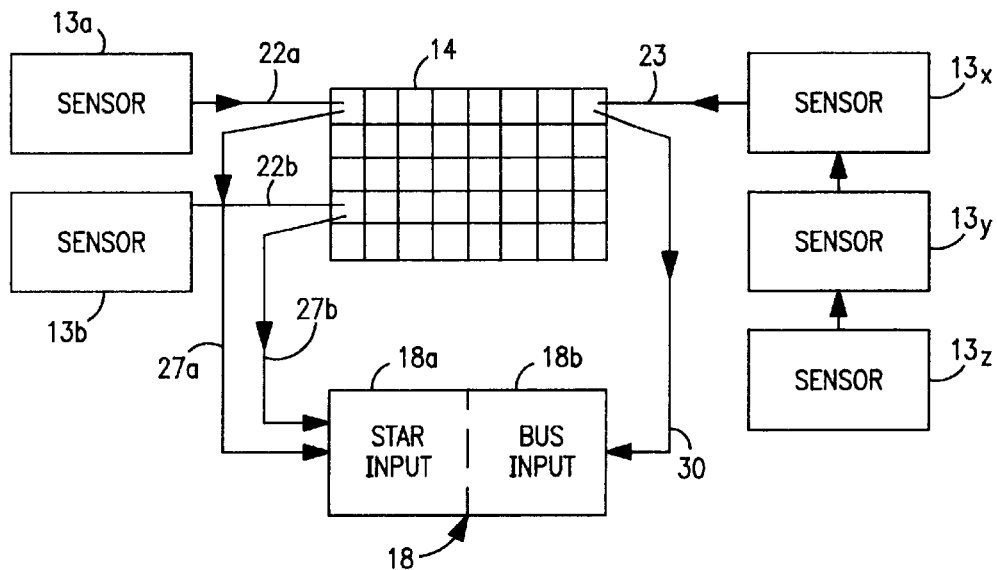
FIG. 4 is a schematic view of the star-configured and bus cabling of a pre-automation device.

The inputs/outputs circuit 18 is provided to be connected, by means of the terminal board 14, to sensors $13_a$, $13_b$ (FIG. 4) by conductors $22_a$, $27_a$ and $22_b$, $27_b$ in a star configuration, and to sensors $13_x$, $13_y$ and $13_z$, in series by a bus 23, 30.

The microprocessor 19 is microprogrammed in order to perform a number of functions, e.g.:

the acquisition of information coming from the sensors 13, memorization of information coming from the sensors 13, with the date and time of acquisition thereof, management of communications with the supervision unit, localized access control, schedule management, and regulation, without the intervention of the supervision unit 11, and all other functions which may be necessary for a Technical Management of the Building or a Centralized Administrative Management.

Microprogramming of the microprocessor 19 may be realized either from the supervision unit 11 or from the portable computer 20.

The microprocessor 19 comprises, in known fashion, a central unit, a random-access memory, and a read-only memory which contains the program for processing the functions defined above.

Figure 5:
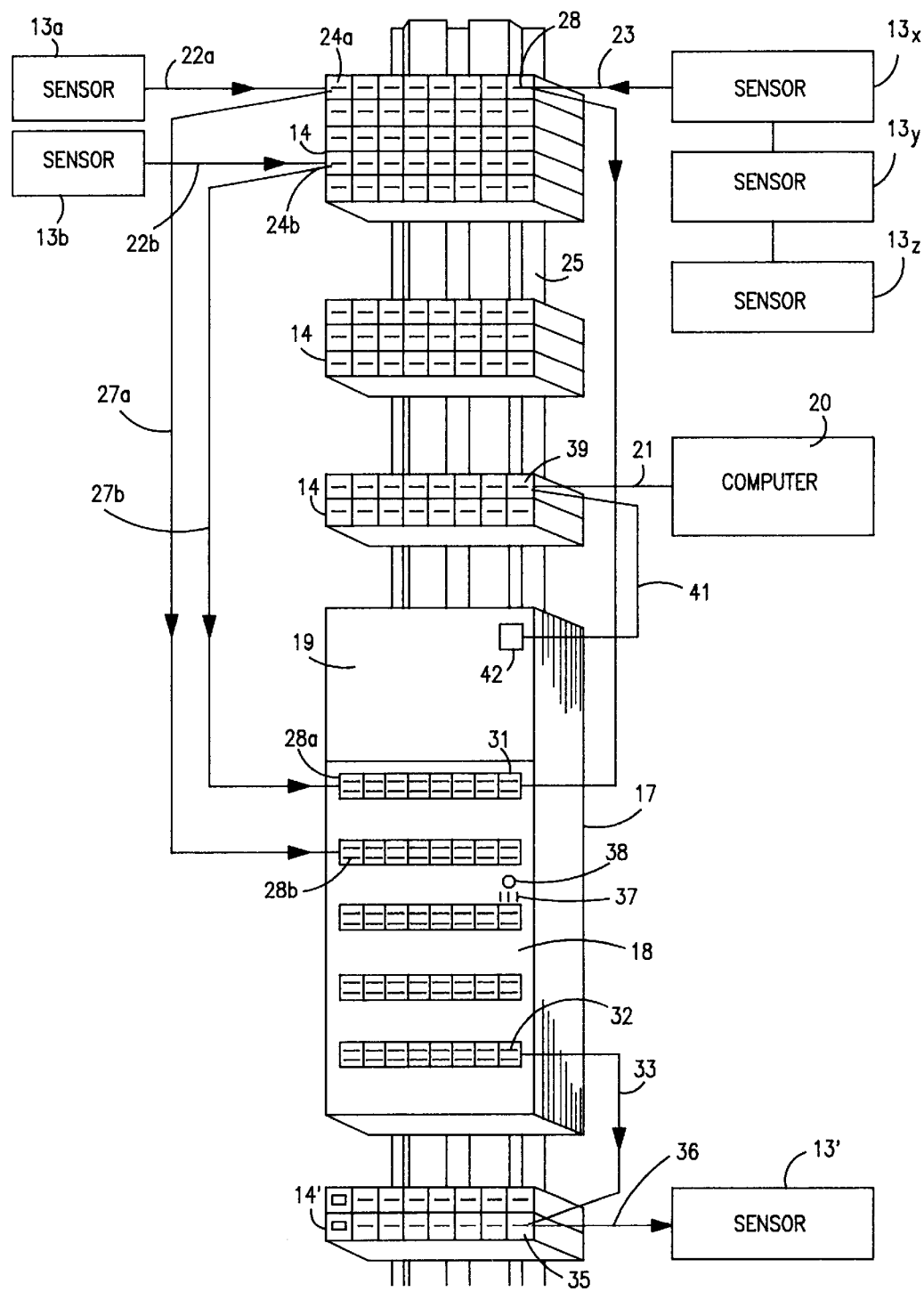
FIG. 5 is a view illustrating a pre-automation device according to the invention mounted on a pre-cabling support.

The various elements of a pre-automation device according to the invention are mounted on a pre-cabling truss 25 in which the wires belonging to the pre-cabling system are arranged, as shown in FIG. 5.

The sensors $13_a$ and $13_b$ are connected respectively by cables $22_a$, $22_b$ to terminals $24_a$, $24_b$ of the terminal board 13 by its rear face. These terminals $24_a$, $24_b$ are connected by the front face of the terminal board, by the cables $27_a$, $27_b$ respectively, to two inputs $28_a$, $28_b$ of the inputs/outputs circuit 18.

The sensors $13_x$, $13_y$ and $13_z$ are connected by a bus 23 to a terminal 28 by its rear face of the terminal board. This terminal is connected by the front face of the terminal board to an input terminal 31 of the inputs/outputs circuit 18 by a cable 30.

Similarly, an actuating element 13' receives an electric signal, by means of an output terminal 32 of the inputs/outputs circuit 18, of a first cable 33 which connects it to a terminal 35 of the terminal board 14' by its front face, and of a second cable 36 between the rear face of the terminal 35 and the actuating element 13'.

The cables $22_a$, $22_b$, 23 and 36 belong to the pre-cabling network and are connected to the terminal board 14, 14' by its rear face, while the cables $27_a$, $27_b$, 30 and 33 are put in place upon request and are connected to the terminal board by the front face.

The inputs/outputs terminals of the inputs/outputs circuit 18 may be of any known type and each may comprise a coded marking 37 and a signal light 38.

The portable computer 20 is connected to the microprocessor 19 by means of the cable 21, of an input terminal 39 of the terminal board 14, of an output terminal 40, and of a cable 41 connected to a special socket 42 of the microprocessor 19. In a variant, the cable 21 may be connected directly to the special socket 42.

For informational purposes, each pre-automation device is provided to be connected to twenty-five sensors and/or actuating elements, and it is therefore necessary Ito install approximately forty devices for a system having one thousand measuring points.

I claim:

1. A system for monitoring sensors and controlling actuating elements in a building comprising:

a supervision unit for centrally collecting information from said sensors and controlling said actuating elements;

a plurality of interconnection devices which connect to said actuating elements and said sensors, comprising:
   (a) a plurality of terminal boards connected to said sensors and actuating elements through conductors of a first set of cables;
   (b) a microprocessor having a plurality of I/O connections, a portion of said I/O connections being connected to said terminal boards through conductors of a second set of cables to transmit signals for controlling said actuating elements and for receiving signals from said sensors; and a precabling system within said building connecting said supervision unit to a remaining portion of said I/O connections wherein said signals may be transferred to and from said interconnection devices and said supervision unit.

2. The system according to claim 1 wherein said first set of cables are prewired cables in said building.

3. The system according to claim 1 wherein said microprocessor includes a socket for connection to a portable computer which programs said microprocessor.

4. The system according to claim 2 wherein said interconnecting devices are supported on said precabling system.

5. The system according to claim 2 wherein said portion of said I/O connections include a star connection to some of said sensors and a buss connection to other of said sensors.

* * * * *